United States Patent Office 3,663,505
Patented May 16, 1972

3,663,505
ANTIOZONANT COMPOSITION AND USE THEREOF IN NATURAL AND SYNTHETIC RUBBER COMPOSITIONS
Alfred E. Hoffman, Saddle River, N.J., assignor to Universal Oil Products Company, Des Plaines, Ill.
No Drawing. Continuation-in-part of application Ser. No. 666,493, Sept. 8, 1967. This application Apr. 2, 1970, Ser. No. 25,256
Int. Cl. C08d 11/04
U.S. Cl. 260—45.9 R     10 Claims

ABSTRACT OF THE DISCLOSURE

Novel antiozonant composition comprising a mixture of N,N'-di-alkyl-p-phenylenediamine in which each alkyl contains 6 to 10 carbon atoms, N-phenyl-N'-alkyl-p-phenylenediamine in which the alkyl contains 3 to 6 carbon atoms, and N-phenyl-N'-alkyl-p-phenylenediamine in which the alkyl contains 7 to 10 carbon atoms, and use of said composition in rubber.

CROSS REFERENCE TO RELATED APPLICATION

This is a continuation-in-part of co-pending application Ser. No. 666,493 filed Sept. 8, 1967, now abandoned.

BACKGROUND OF THE INVENTION

Various phenylenediamine derivatives have been found to be very active antiozonants in rubber. However, some of these phenylenediamine derivatives impart undesirable properties to the rubber products. Accordingly, an important improvement in the art of antiozonation would be achieved if some means were found to further improve the high antiozonant properties of phenylenediamine derivatives but avoiding the undesirable effects heretofore observed.

DESCRIPTION OF THE INVENTION

It now has been discovered that advantage may be taken of the desirable properties of certain phenylenediamine derivatives to further improve antiozonant properties while avoiding undesirable side effects. This is accomplished in accordance with the present invention by utilizing a specific mixture of certain phenylenediamine derivatives. However, in utilizing such a mixture, a number of important considerations must be met. For example, some phenylenediamine derivatives impart a blooming effect when used in rubber goods and this is objectionable. Therefore, a new composition must avoid these undesirable properties. Furthermore, a mixture of phenylenediamine derivatives must be compatible and not result in antagonistic effects. Still further, such a mixture must form a homogeneous mixture and retain this property over a wide temperature range which may be encountered in the use of the mixture. In addition, the mixture must not affect too greatly the scorching properties of the rubber formulation containing the mixture.

From the above discussion, it will be seen that the use of a novel mixture of phenylenediamine derivatives presents complications. Accordingly, the formation of a mixture having improved overall properties cannot be predicted but must be determined empirically.

It now has been found that a novel mixture comprising three different phenylenediamine derivatives possesses improved antiozonant properties, and further satisfied the desirable requirements as hereinbefore set forth, without the undesirable effects. Thus the novel mixture of the present invention provides an antiozonant composition of improved chemical and physical properties.

In one embodiment, the present invention relates to an antiozonant composition of from about 20% to about 50% by weight of an N,N'-di-sec-alkyl-p-phenylene diamine in which each alkyl contains 6 to 10 carbon atoms, N-phenyl-N'-sec-alkyl-p-phenylenediamine in which the alkyl contains 3 to 6 carbon atoms and N-phenyl-N'-sec-alkyl-p-phenylenediamine in which the alkyl contains 7 to 10 carbon atoms.

In another embodiment, the present invention relates to the use of the above mixture as an additive in rubber.

As hereinbefore set forth, one component of the composition of the present invention is an N,N'-di-sec-alkyl-p-phenylenediamine in which each alkyl contains 6 to 10 carbon atoms. A particularly preferred component is N,N'-di-sec-octyl-p-phenylenediamine and more particularly, N,N'-di-(1-methylheptyl)-p-phenylenediamine. Other derivatives for use as this component of the composition include N,N'-di-sec-hexyl-p-phenylenediamine, including N,N'-di-(1-methylpentyl)-p-phenylenediamine, N,N'-di-(1-ethylbutyl)-p-phenylenediamine, etc., N,N'-di-sec-heptyl-p-phenylenediamine and particularly N,N'-di-(1,4-dimethylpentyl)-p - phenylenediamine, N,N'-di-(1-methylhexyl) - p-phenylenediamine, N,N'-di-(1-propylbutyl)-p-phenylenediamine, etc., other N,N'-di-sec-octyl-p-phenylenediamines, including N,N'-di-(1-ethyl-3-methylpentyl)-p-phenylenediamine, N,N'-di-(1-propylpentyl)-p-phenylenediamine, etc., N,N'-di-sec-nonyl-p-phenylenediamine including N,N'-di-(1-methyloctyl)-p-phenylenediamine, N,N'-di-(1-ethylheptyl)-p-phenylenediamine, N,N'-di-(1-butylpentyl)-p-phenylenediamine, etc., and N,N'-di-sec-decyl-p-phenylenediamine, including N,N'-di-(1-methylnonyl) - p-phenylenediamine, N,N'-di-(1-ethyloctyl)-p-phenylenediamine, N,N'-di-(1-propylheptyl)-p-phenylenediamine, N,N'-di-(1-butylhexyl)-p-phenylenediamine, etc.

As hereinbefore set forth, a second component of the novel composition of the present invention is N-phenyl-N'-sec-alkyl-p-phenylenediamine in which the alkyl contains 3 to 6 carbon atoms. A particularly preferred derivative for use as this component of the composition is N-phenyl-N'-(1,3-di-methylbutyl)-p-phenylenediamine. Other derivatives for this component include N-phenyl-N'-isopropyl-p-phenylenediamine, N-phenyl-N'-(1-methylpropyl)-p-phenylenediamine, N-phenyl-N'-(sec-pentyl)-p-phenylenediamine, including N-phenyl-N'-(1-methylbutyl)-p-phenylenediamine, N-phenyl-N'-(1-ethylpropyl)-p-phenylenediamine, etc., other N-phenyl-N'-(sechexyl)-p-phenylenediamine, including N-phenyl-N'-(1-methylpentyl)-p-phenylenediamine, N-phenyl-N'-(1-ethylbutyl)-p-phenylenediamine, etc.

Another component of the novel composition of the present invention is an N-phenyl-N'-sec-alkyl-p-phenylenediamine in which the alkyl contains 7 to 10 carbon atoms. A preferred component is N-phenyl-N'-(1-methylheptyl)-p-phenylenediamine. Other derivatives comprise N-phenyl-N'-(sec-heptyl)-p-phenylenediamine including N-phenyl-N'-(1-methylhexyl)-p-phenylenediamine,
N-phenyl-N'-(1-ethylpentyl)-p-phenylenediamine,
N-phenyl-N'-(1-ethyl-3-methylbutyl)-p-phenylenediamine,
N-phenyl-N'-(1-propylbutyl)-p-phenylenediamine, etc., other N-phenyl-N'-(sec-octyl) - p - phenylenediamine including N-phenyl-N'-(1-ethylhexyl)-p-phenylenediamine,
N-phenyl-N'-(1-ethyl-4-methylpentyl)-p-phenylenediamine,
N-phenyl-N'-(1-propylpentyl)-p-phenylenediamine, etc., N-phenyl-N'-(sec-nonyl)-p-phenylenediamine including N-phenyl-N'-(1-methyloctyl)-p-phenylenediamine,
N-phenyl-N'-(1,6-di-methylheptyl)-p-phenylenediamine,
N-phenyl-N'-(1-ethylheptyl)-p-phenylenediamine,
N-phenyl-N'-(1-propylhexyl)-p-phenylenediamine, etc., and N-phenyl-N'-(sec-decyl)-p-phenylenediamine including N-phenyl-N'-(1-methylnonyl)-p-phenylenediamine,
N-phenyl-N'-(1,7-dimethyloctyl)-p-phenylenediamine,
N-phenyl-N'-(1-ethyloctyl)-p-phenylenediamine,
N-phenyl-N'-(1,5-di-ethylhexyl)-p-phenylenediamine,
N-phenyl-N'-(1-butylhexyl)-p-phenylenediamine, etc.

The p-phenylenediamine derivatives for use in the present invention are prepared in any suitable manner. In a preferred method, these are prepared by the reductive alkylation of p-phenylenediamine or p-nitroaniline with the desired ketone. For example, N,N'-di-(1-methylheptyl)-p-phenylenediamine is prepared by the reductive alkylation of 1 mol proportion of p-nitroaniline with 2 mol proportions of methylhexyl ketone. Similarly, N-phenyl-N'-(1,3-di-methylbutyl)-p-phenylenediamine is prepared by the reductive alkylation of equal mol proportions of p-aminodiphenylamine, p-nitrodiphenylamine or p-nitrosodiphenylamine and methylisobutyl ketone. In a similar manner, N-phenyl - N' - (1-methylheptyl)-p-phenylenediamine is prepared by the reductive alkylation of equal mol proportions of p-aminodiphenylamine and methylhexyl ketone.

The reductive alkylation is effected in any suitable manner and generally under a hydrogen pressure of from about 100 to 3,000 p.s.i. or more and in particular of from about 1,000 to about 2,000 p.s.i., temperature of from about 200° to about 500° F. and more particularly from about 250° to about 350° F. Generally an excess of ketone is used in the reaction mixture and may comprise up to about 20 or more mols of ketone per mol of p-nitroaniline or p-phenylenediamine. Any suitable reductive alkylation catalyst is used. One catalyst comprises an intimate mixture of copper oxide, chromium oxide and barium oxide. Other catalyst include those containing nickel, molybdenum, platinum and/or palladium. A particularly preferred catalyst comprises a composite of alumina with from about 0.1 to 10% or more of platinum, which composite may or may not contain chlorine and/or fluorine in a total concentration of from about 0.2 to 10% or more by weight of the composite.

As hereinbefore set forth, the components of the novel composition of the present invention are used in a proportion of from about 20% to about 50% by weight of each of the components. These proportions are essential in order to obtain the improved benefits of the composition. Thus, at least 20% of each component must be present in the composition. When these components are used in these proportions, the improved benefits result from an interrelated and mutually cooperative action, thereby resulting in a novel composition having improved antiozonant activity as compared to the use of each of the components separately, but avoids the objections inherent in the use of the individual components alone. In addition to the improved antiozonant potency, the novel composition also possesses antioxidant properties and contributes to inhibiting oxidative deterioration of the rubber. The exact mechanism for these improved results is not completely understood and undoubtedly comprises a combination of physical and chemical properties.

The novel composition of the present invention is used in rubber in a concentration sufficient to effect the desired stabilization. The concentration may range from about 1.5% to about 6% and more particularly from 2% to 4% by weight of the rubber although, in some cases, higher or lower concentrations may be employed. These concentrations are based on the rubber hydrocarbon exclusive of the other components of the rubber composition and are used in this manner in the present specification and claims. When desired, the composition of the present invention may be used along with an additional antioxidant and also is used along with other additives incorporated in rubber for specific purposes including accelerators, softeners, extenders, wax reinforcing agents, etc.

When used along with an additional antioxidant, it is understood that any suitable antioxidant may be employed including, for example, 2,6-di-tert-butyl-4-methylphenol, phenyl-beta-naphthylamine, 6 - phenyl-2,2,4-trimethyl-1,2-dihydroquinoline, marketed under the tradename of "Santoflex-B," 2,2' - methylene-bis-(4-methyl-6-tert-butyl-phenol), 2,6-di-tert-butyl-p-cresol, the reaction product of acetone and diphenylamine, marketed under the tradename of "B.L.E.," etc. These antioxidants generally are used in a concentration of from about 0.5% to about 3% by weight of the polymer.

When desired, the composition of the present invention also is used along with paraffin and/or microcrystalline wax. The wax generally is utilized in a concentration of from 0.5% to about 3% by weight of the polymer.

In one embodiment the components of the composition of the present invention are added separately to the rubber formulation. In another and preferred embodiment the components of the composition of the present invention are combined and then added to the rubber formulation. In still another embodiment the composition of the present invention is admixed with the additional antioxidant, wax and/or other additives, and the mixture then is composited with one or more of the other components of the rubber formulation. In a preferred embodiment the composition of the present invention is incorporated in the latex prior to milling. In still another embodiment vulcanized rubber may be soaked, dipped or suspended in the composition of the present invention to apply a surface coating to the rubber, or the composition of the present invention may be sprayed, poured or otherwise contacted with the previously vulcanized rubber.

The composition of the present invention is utilized in any rubber formulation subject to ozone cracking, including those used for automobile and truck tires and tubes, hose, belting, sheet and thread rubber, rubberized fabrics, molded goods, boots and shoes, etc. whether vulcanized in a mold, in open steam, in hot air, or in the cold by the so-called acid process. In another embodiment, the present invention can be utilized for the stabilization of adhesives, elastomers, etc., which tend to crack due to ozone.

When the composition of the present invention is added to a liquid such as rubber pigment or an oil, it is dissolved therein in the desired proportions. When the composition of the present invention is added to a solid substrate, it is incorporated therein by milling, mastication, etc. The composition of the present invention may be utilized as such or as a solution or dispersion or it may be formed as a powder, paste, etc. by compositing with a solid such as carbon black, alumina, silicon, etc.

In general, rubber is classified as a vulcanizable diene hydrocarbon rubber and comprises polymers of conjugated 1,3-dienes, either as polymers thereof or as co-polymers thereof with other polymerizable compounds. In one embodiment the rubber is a synthetic rubber including, for example, butadienestyrene copolymer rubber presently referred to in the art as SBR rubber, buna-N rubber (NBR) produced from butadiene and acrylonitrile, butyl rubber produced from butadiene and isobutylene, neoprene, ethylene-propylene copolymer rubber (EP), terpolymer rubbers as EP terpolymers, etc. The natural rubbers include Hevea rubber, caoutchouc, balata, guttapercha, etc. It is understood that the term rubber as used in the present specification and claims is intended to include both synthetic rubber and natural rubber which undergo cracking due to ozone.

The following examples are introduced to illustrate further the novelty and utility of the present invention but not with the intention of unduly limiting the same.

EXAMPLE I

The 3-component mixture of this example was prepared to comprise equal parts by weight of N,N'-di-(1-methylheptyl) - p - phenylenediamine, N-phenyl-N'-(1,3-di-methylbutyl)-p-phenylenediamine and N-phenyl-N'-(1-methylheptyl)-p-phenylenediamine.

EXAMPLE II

Another antiozonant composition is prepared to contain 20% by weight of N,N' - di - (1 - methylheptyl)-p-phenylenediamine, 50% by weight of N-phenyl-N'-(1,3-di - methylbutyl) - p - phenylenediamine and 30% by weight of N - phenyl - N' - (1 - methylheptyl)-p-phenylenediamine.

EXAMPLE III

Still another antiozonant composition is prepared to contain 25% by weight of N,N' - di - (1 - ethyl - 3 - methylpentyl) - p - phenylenediamine, 35% by weight of N - phenyl - N' - (1,3 - di - methylbutyl) - p - phenylenediamine and 40% by weight of N-phenyl-N'-(1-methylheptyl)-p-phenylenediamine.

EXAMPLE IV

The antiozonant composition of this example is prepared to contain 30% by weight of N,N' - di - (1-methylpentyl) - p - phenylenediamine, 35% by weight of N-phenyl - N' - (1 - methylbutyl) - p - phenylenediamine and 35% by weight of N-phenyl - N' - (1-methylnonyl)-p-phenylenediamine.

EXAMPLE V

The antiozonant composition of this example is prepared to contain 20% by weight of N,N' - di - (isopropyl) - p - phenylenediamine, 40% by weight of N-phenyl-N' - (1 - methylpentyl) - p - phenylenediamine and 40% by weight of N - phenyl - N' - (1-methyloctyl)-p-phenylenediamine.

EXAMPLE VI

Another antiozonant composition is prepared to contain ⅓ part by weight of N,N' - di - (1,4 - di - methylpentyl)-p-phenylenediamine, ⅓ part by weight of N-phenyl-N'-(1-methylpropyl) - p - phenylenediamine and ⅓ part by weight of N - phenyl - N' - (1 - methylhexyl) - p - phenylenediamine.

EXAMPLE VII

The 3-component mixture described in Example I was utilized as an antiozonant in a commercial polyisoprene base rubber stock. The uninhibited rubber stock was milled with 3.5 phr. (parts per hundred) of the 3-component composition of Example I and cured for 25 minutes at 300° F.

In one evaluation, the rubber sample was evaluated in a dynamic antiozonant activity test in which a sample of the rubber is cured onto a belt and the belt is flexed at 72° F. in an atmosphere of 40 p.p.m. (parts per hundred million) of ozone. The time to first crack is noted. When evaluated in this manner, the rubber sample containing the antiozonant composition did not undergo cracking for more than 168 hours, at which time the test was terminated. In contrast to the above, three other samples of the same rubber containing different commercial antiozonants all underwent cracking in less than 72 hours when evaluated in the same manner.

For comparative purposes another sample of the uninhibited rubber was prepared to contain 3.5 phr. of a 2-component mixture comprising equal parts by weight of N,N' - di - (1 - methylheptyl) - p - phenylenediamine and N - phenyl - N' - (1 - methylheptyl) - p - phenylenediamine. The rubber stock was cured and evaluated in the same manner as described above. This sample underwent cracking in less than 120 hours. Thus it is seen that the 3-component mixture was more effective than the 2-component mixture is retarding cracking of the rubber.

EXAMPLE VIII

A similar series of evaluations was made when using a carboxylated natural rubber stock. When evaluated in the dynamic test described above, again using 3.5 phr. of the antiozonant composition, the rubber containing the 3-component mixture of Example I did not undergo cracking until about 144 hours. In contrast the sample containing the 2-component mixture described in Example VII underwent cracking in less than 96 hours.

EXAMPLE IX

The samples or rubber described in Example VIII also were evaluated in a static test, in which a sample of the rubber is elongated and placed in an ozone cabinet maintained at 100° F. and an ozone concentration of 50 p.p.h.m. In the sample elongated 20%, the rubber sample containing the 3-component mixture of Example I did not undergo cracking for more than 168 hours, at which time the test was terminated. In contrast, the sample of rubber containing 3.5 phr. of the 2-component mixture described in Example VII and elongated 20% underwent cracking within 24 hours of exposure in the ozone cabinet. Here again the improved results obtained by the 3-component mixture are demonstrated.

EXAMPLE X

The composition prepared as described in Example I was evaluated for physical properties in the following manner. The mixture was seeded with a few crystals of N - phenyl - N' - 1,3-dimethylbutyl)-p-phenylenediamine which is a solid at room temperature. Because it is a solid at room temperature, the N - phenyl - N'-1,3-dimethylbutyl)-p-phenylenediamine was heated to approximately 140° F. and cooled to room temperature before mixing in the blend. The mixture was stored at 72° F. in a constant temperature room. After 38 months, the mixture remained as a homogeneous solution, without crystallizing out of solution of any of the components.

EXAMPLE XI

Another 3-component mixture was evaluated in the manner as described in Example X. This mixture comprised equal parts by weight of N,N'-di-(1,4-dimethylpentyl) - p-phenylenediamine, N-phenyl-N'-(1,3-dimethylbutyl)-p-phenylenediamine and N-phenyl-N'-(1-methylheptyl)-p-phenylenediamine. This mixture was stored at 72° F. and after 38 months remained as a homogeneous solution without any component precipitating out of solution.

For comparative purposes a 2-component mixture was prepared to contain equal parts by weight of N,N'-di-(1,4-dimethylpentyl)-p-phenylenediamine and N-phenyl-N'-(1,3-dimethylbutyl)-p-phenylenediamine. After storage at 72° F. for 38 months, a portion of the mixture precipitated out of solution. It is believed that the portion which precipitated out of solution is the N-phenyl-N'-(1,3 - dimethylbutyl)-p-phenylenediamine. As hereinbefore set forth, the 2-component mixture must be given an additional treatment at time of use in order to be satisfactorily used.

EXAMPLE XII

The composition prepared as described in Example I is used in a concentration of 3% by weight in a synthetic butadiene-styrene rubber. More particularly, the base rubber is of the following recipe:

TABLE I

| Ingredient: | Parts by weight |
|---|---|
| SRB-1502 | 100 |
| Furnace black | 40 |
| Zinc oxide | 3 |
| Stearic acid | 2 |
| Sulfur | 2 |
| Accelerator [1] | 1 |

[1] N-cyclohexyl-2-benzothiazole-sulfeneamide.

When the composition of the present invention is used in the rubber formulation set forth above, it was found to impart high antiozonant properties to the rubber, without the disadvantages of blooming which had been encountered hereinbefore when using one of the components alone. The antiozonant composition is a homogeneous liquid which remains unchanged over a wide temperature range. Another important advantage is that the composition provides satisfactory scorching properties. As hereinbefore set forth, all of these benefits apparently result from interrelated and mutually cooperative action, both physical and chemical.

EXAMPLE XIII

The antiozonant compositon prepared as described in Example II is used in a concentration of 3% by weight of a rubber recipe set forth in Example XII and serves to impart high antiozonant properties to the rubber without undesired blooming.

I claim as my invention:

1. An antiozonant composition of from about 20% to about 50% by weight of an N,N'-di-sec-alkyl-p-phenylenediamine in which each alkyl contains 6 to 10 carbon atoms, N - phenyl - N'-sec-alkyl-p-phenylenediamine in which the alkyl contains 3 to 6 carbon atoms and N-phenyl-N'-sec-alkyl-p-phenylenediamine in which the alkyl contains 7 to 10 carbon atoms.

2. The antiozonant composition of claim 1 wherein said N,N'-di-sec-alkyl-p-phenylenediamine is N,N'-di-(1-methylheptyl)-p-phenylenediamine.

3. The antiozonant composition of claim 1 wherein said N,N'-di-sec-alkyl-p-phenylenediamine is N,N'-di-(1-ethyl-3-methylpentyl)-p-phenylenediamine.

4. The antiozonant composition of claim 1 wherein said N,N'-di-sec-alkyl-p-phenylenediamine is N,N'-di-(1,4-dimethylpentyl)-p-phenylenediamine.

5. The antiozonant composition of claim 1 wherein said first mentioned N-phenyl-N'-sec-alkyl-p-phenylenediamine is N-phenyl-N'-(1,3-dimethylbutyl)-p-phenylenediamine.

6. The antiozonant composition of claim 1 wherein said second mentioned N - phenyl-N'-sec-alkyl-p-phenylenediamine is N - phenyl-N'-(1-methylheptyl)-p-phenylenediamine.

7. Vulcanizable diene hydrocarbon rubber containing from about 1.5 to about 6% of the antiozonant composition of claim 1.

8. The composition of claim 7 in which said rubber is synthetic rubber.

9. The composition of claim 8 in which said rubber is styrene-butadiene copolymer.

10. The composition of claim 7 in which said rubber is natural rubber.

References Cited

UNITED STATES PATENTS

| 3,163,616 | 12/1964 | Stahly | 260—45.9 |
| 3,502,612 | 3/1970 | Latos | 260—45.9 |
| 3,274,250 | 9/1966 | Schneider | 260—576 |
| 3,424,713 | 1/1969 | Oberster | 260—45.9 |
| 3,419,639 | 12/1968 | Gentile | 260—45.9 |

FOREIGN PATENTS

| 990,469 | 4/1965 | Great Britain | 260—45.9 |

DONALD E. CZAJA, Primary Examiner

E. C. RZUCIDLO, Assistant Examiner

U.S. Cl. X.R.

252—401; 260—809